(12) United States Patent
Nakagawa et al.

(10) Patent No.: US 10,184,227 B2
(45) Date of Patent: Jan. 22, 2019

(54) WORK MACHINE

(71) Applicant: Kubota Corporation, Osaka-shi (JP)

(72) Inventors: Hiroaki Nakagawa, Sakai (JP);
Masahiro Kuroda, Sakai (JP);
Masahiko Nomura, Sakai (JP);
Shinichi Kawabata, Sakai (JP); Yuki Shimoike, Sakai (JP); Shizuo Demizu, Sakai (JP); Yoshihiro Takayama, Sakai (JP)

(73) Assignee: KUBOTA CORPORATION, Osaka-Shi (JP)

(*) Notice: Subject to any disclaimer, the term of this patent is extended or adjusted under 35 U.S.C. 154(b) by 0 days.

(21) Appl. No.: 15/623,389

(22) Filed: Jun. 15, 2017

(65) Prior Publication Data

US 2017/0362796 A1    Dec. 21, 2017

(30) Foreign Application Priority Data

Jun. 21, 2016 (JP) .................................. 2016-122775
Jun. 21, 2016 (JP) .................................. 2016-122776

(51) Int. Cl.
| | |
|---|---|
| *B60K 6/48* | (2007.10) |
| *B60K 11/02* | (2006.01) |
| *B60K 11/06* | (2006.01) |
| *F01N 3/021* | (2006.01) |
| *E02F 9/08* | (2006.01) |
| *E02F 9/20* | (2006.01) |
| *E02F 3/34* | (2006.01) |

(52) U.S. Cl.
CPC ............. *E02F 9/0866* (2013.01); *B60K 6/48* (2013.01); *B60K 11/02* (2013.01); *B60K 11/06* (2013.01); *E02F 3/3414* (2013.01); *E02F 9/2075* (2013.01); *F01N 3/021* (2013.01); *B60W 2300/17* (2013.01); *B60Y 2200/415* (2013.01); *Y10S 903/903* (2013.01)

(58) Field of Classification Search
CPC ... B60K 1/04; B60K 6/40; B60K 6/20; B60K 11/04; B60K 11/06; B60K 11/08; B60K 2001/0405
See application file for complete search history.

(56) References Cited

U.S. PATENT DOCUMENTS 4,049,072 A * 9/1977 Savage ................... B60K 17/14
180/242
6,688,481 B1 * 2/2004 Adner ...................... B60K 6/32
212/195

(Continued)

FOREIGN PATENT DOCUMENTS

| JP | 2010-059734 | 3/2010 |
| JP | 2015-206193 | 11/2015 |
| WO | WO 2013/018422 | 2/2013 |

*Primary Examiner* — James A Shriver, II
*Assistant Examiner* — Vaughn Coolman
(74) *Attorney, Agent, or Firm* — Mori & Ward, LLP

(57) ABSTRACT

A work machine includes a machine body, an engine, a rotary electrical device, and a battery. The engine is provided on the machine body to move the machine body. The rotary electrical device is provided on the machine body to move the machine body and to generate electric power. The battery is to be charged by the rotary electrical device and to discharge electric power to the rotary electrical device to move the machine body. The battery being is provided adjacent to the engine.

19 Claims, 15 Drawing Sheets

(56) References Cited

U.S. PATENT DOCUMENTS

| | | | | |
|---|---|---|---|---|
| 6,922,925 B2* | 8/2005 | Watanabe | E02F 3/325 | 123/41.49 |
| 8,100,210 B2* | 1/2012 | Takeuchi | B60K 1/04 | 180/65.1 |
| 8,327,811 B2* | 12/2012 | Hokimoto | B60K 11/04 | 123/41.04 |
| 8,381,856 B2* | 2/2013 | Shimomura | B60K 1/04 | 180/291 |
| 8,540,042 B2* | 9/2013 | Atarashi | B60K 1/04 | 180/68.1 |
| 8,616,322 B2* | 12/2013 | Shimomura | B60K 1/04 | 180/291 |
| 8,640,803 B2* | 2/2014 | Kinoshita | B62D 25/10 | 180/68.1 |
| 8,662,969 B2* | 3/2014 | Shimomura | B60K 1/04 | 180/65.22 |
| 8,829,743 B2* | 9/2014 | Watanabe | H02K 9/19 | 310/54 |
| 8,836,180 B2* | 9/2014 | Satou | H02K 7/086 | 310/102 R |
| 8,919,465 B2* | 12/2014 | Takeo | B66C 1/08 | 180/65.21 |
| 8,960,346 B2* | 2/2015 | Ogawa | B60K 11/06 | 180/68.1 |
| 9,045,879 B2* | 6/2015 | Watanabe | E02F 9/26 | |
| 9,067,490 B2* | 6/2015 | Matsumoto | B60K 15/077 | |
| 9,107,286 B2* | 8/2015 | Tsuchiya | E02F 9/0858 | |
| 9,156,341 B2* | 10/2015 | Matsumura | B60K 1/04 | |
| 9,217,239 B2* | 12/2015 | Hirozawa | E02F 9/2095 | |
| 9,362,797 B2* | 6/2016 | Murata | E02F 9/0858 | |
| 9,586,498 B2* | 3/2017 | Seimiya | B60K 1/04 | |
| 2010/0297926 A1* | 11/2010 | Shimomura | B60K 1/04 | 454/141 |
| 2013/0071212 A1* | 3/2013 | Yunoue | B60K 11/08 | 414/685 |
| 2013/0078071 A1* | 3/2013 | Noguchi | B60K 1/04 | 414/719 |
| 2013/0216344 A1 | 8/2013 | Uetake | | |
| 2014/0000973 A1* | 1/2014 | O'Donnell | E02F 9/0858 | 180/165 |
| 2014/0116797 A1* | 5/2014 | Hayashi | B60K 13/04 | 180/309 |
| 2014/0291047 A1* | 10/2014 | Matsumoto | B60K 15/077 | 180/69.4 |
| 2015/0191894 A1* | 7/2015 | Huissoon | E02F 3/301 | 414/687 |
| 2016/0273441 A1* | 9/2016 | Kikuchi | F01N 13/1822 | |
| 2016/0288639 A1* | 10/2016 | Kikuchi | B60K 13/04 | |
| 2016/0293906 A1* | 10/2016 | Ito | A01D 34/64 | |
| 2016/0324039 A1* | 11/2016 | Souda | E02F 9/0866 | |
| 2017/0174069 A1* | 6/2017 | Oyama | B60K 6/52 | |
| 2017/0226715 A1* | 8/2017 | Ota | E02F 3/32 | |
| 2018/0058035 A1* | 3/2018 | Huissoon | E02F 9/08 | |

* cited by examiner

WORK MACHINE

CROSS-REFERENCE TO RELATED APPLICATIONS

The present application claims priority under 35 U.S.C. § 119 to Japanese Patent Application No. 2016-122775, filed Jun. 21, 2016 and Japanese Patent Application No. 2016-122776, filed Jun. 21, 2016. The contents of these applications are incorporated herein by reference in their entirety.

BACKGROUND OF THE INVENTION

Field of the Invention

The present invention relates to a work machine.

Discussion of the Background

There has conventionally been known a work machine like a compact track loader disclosed in JP 2010-59734 A. The work machine according to JP 2010-59734 A includes a machine body, an engine provided to the machine body, a hydraulic pump configured to be driven by motive power of the engine, and a work implement provided to the machine body and configured to be actuated by hydraulic oil of the hydraulic pump. Recently developed is a hybrid work machine as disclosed in JP 2015-206193 A, including a motor as well as an engine as power sources configured to actuate a hydraulic pump.

A hybrid work machine at least includes a motor, an inverter configured to control electric power of the motor, and a battery configured to store electric power. A work machine, unlike a motor vehicle, is configured to perfomi a task. The motor, the inverter, the battery, and the like thus need to be disposed in view of various perspectives, causing a demand for development of new work machines.

SUMMARY OF THE INVENTION

According to one aspect of the present invention, a work machine includes a machine body, an engine, a rotary electrical device, and a battery. The engine is provided on the machine body to move the machine body. The rotary electrical device is provided on the machine body to move the machine body and to generate electric power. The battery is to be charged by the rotary electrical device and to discharge electric power to the rotary electrical device to move the machine body. The battery being is provided adjacent to the engine.

According to another aspect of the present invention, a work machine includes a machine body, an engine, a rotary electrical device, a battery, and a first cooling fan. The engine is provided on the machine body to move the machine body. The rotary electrical device is provided on the machine body to move the machine body and to generate electric power. The battery is provided above the engine in a height direction along a height of the work machine to be charged by the rotary electrical device and to discharge electric power to the rotary electrical device to move the machine body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 10 is a front perspective view of a battery unit and the like.

FIG. 11 is a rear perspective view of a cooling fan and the like.

DESCRIPTION OF EMBODIMENTS

Figure 1:
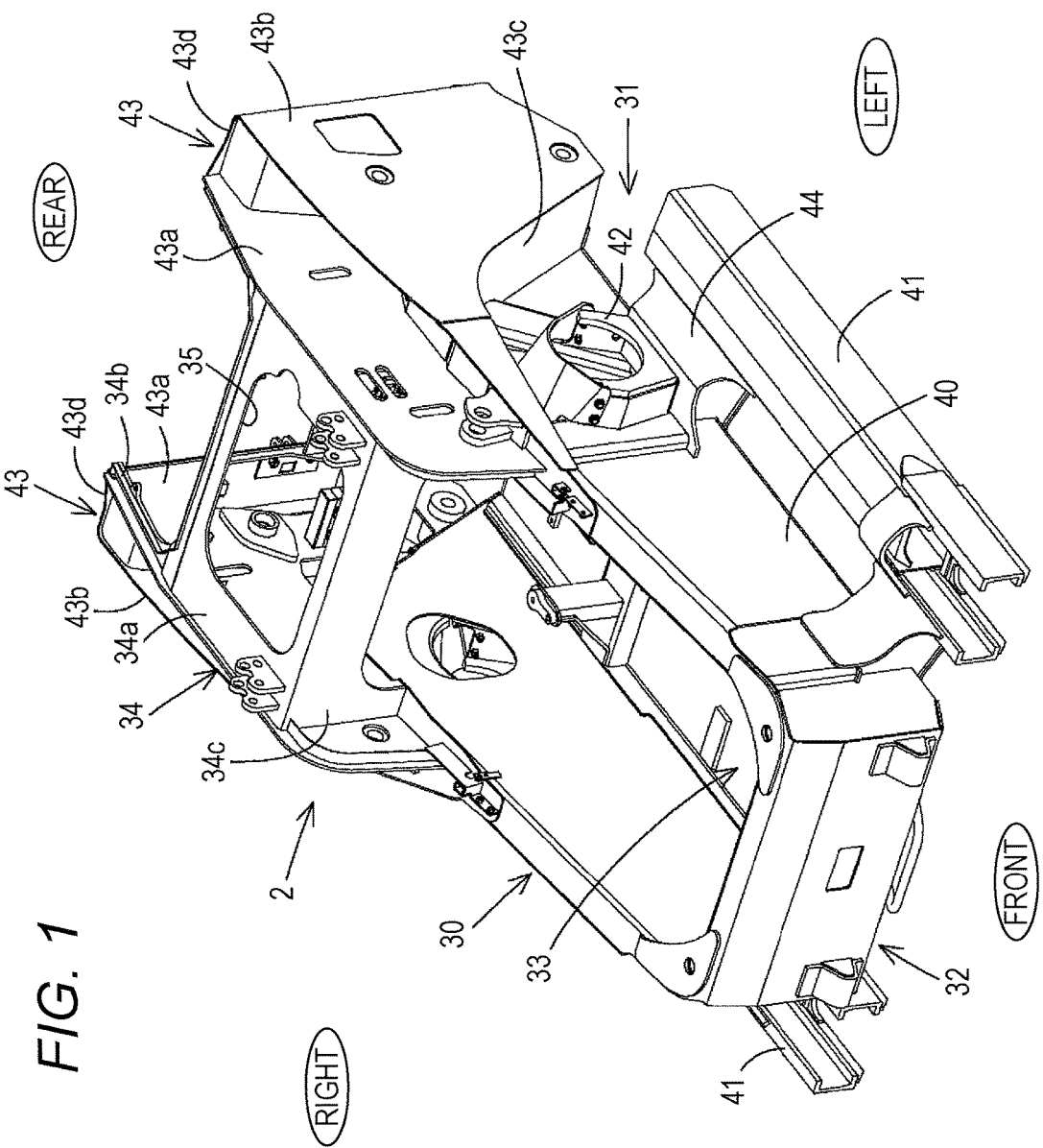
FIG. 1 is a perspective view of a machine body.

The embodiments will now be described with reference to the accompanying drawings, wherein like reference numerals designate corresponding or identical elements throughout the various drawings.

A work machine according to an embodiment of the present invention will now be described below with reference to the drawings.

Figure 15:
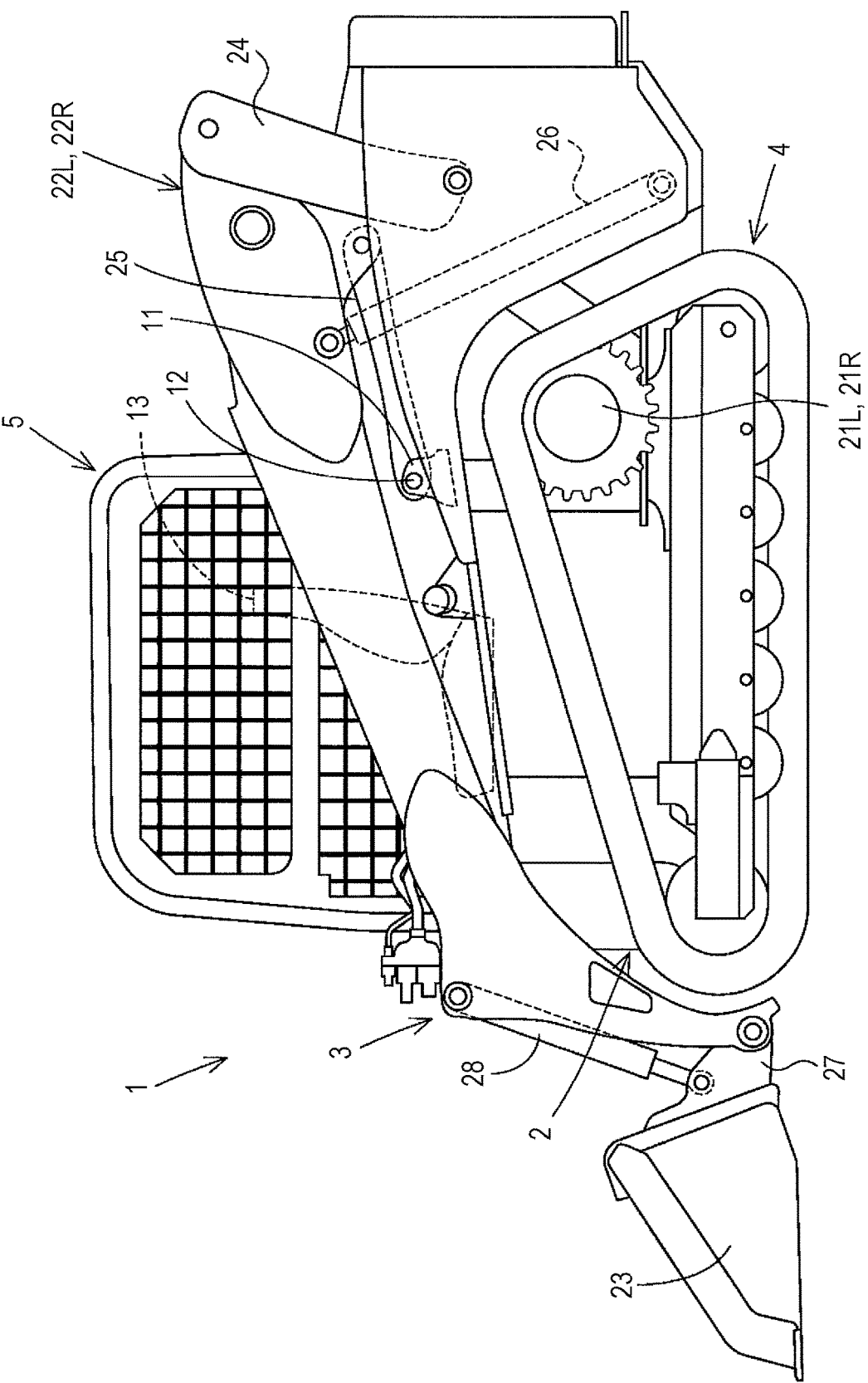
FIG. 15 is a side view of an entire work machine.

FIG. 15 is a side view of a work machine 1 according to the embodiment of the present invention. FIG. 15 shows a compact track loader as an exemplary work machine. The work machine according to the embodiment of the present invention is not limited to such a compact track loader, but examples thereof include a different type of a loader work machine such as a skid-steer loader. The examples thereof also include work machines other than the loader work machine.

The work machine 1 includes a machine body 2, a work implement 3 mounted to the machine body 2, and a travel device 4 supporting the machine body 2. In the embodiment of the present invention, assume that the front (the left in FIG. 15) of a driver on a driver's seat of the work machine is directed forward, the rear (the right in FIG. 15) of the driver is directed backward, the left (the near side in FIG. 15) of the driver is directed leftward, and the right (the far side in FIG. 15) of the driver is directed rightward. Furthermore, a direction perpendicular to the front and rear ends of the machine body is occasionally assumed as a machine body width direction (width direction).

The machine body 2 is mounted, in an upper front portion thereof, with a cabin 5. The cabin 5 has a rear portion supported by a bracket 11 of the machine body 2 so as to be swingable about a support shaft 12. The cabin 5 has a front portion that can be placed on the front portion of the machine body 2.

The cabin 5 is provided therein with a driver's seat 13. The driver's seat 13 is provided, on one side (e.g. the left) thereof, with a travel operation device configured to operate the travel device 4.

The travel device 4 is configured as a crawler travel device. The travel device 4 is provided on each of the left and the right of the machine body 2. The travel device 4 includes a first travel unit 21L and a second travel unit 21R configured to be actuated by hydraulic driving, and is configured to travel by means of the first travel unit 21L and the second travel unit 21R.

The work implement 3 includes a boom 22L, a boom 22R, and a bucket 23 (work tool) mounted at the distal ends of the booms 22L and 22R. The boom 22L is disposed on the left of the machine body 2. The boom 22R is disposed on the right of the machine body 2. The boom 22L and the boom 22R are coupled to each other via a coupling body. The boom 22L and the boom 22R are supported by a first lift link 24 and a second lift link 25. Provided between a proximal portion of each of the boom 22L and the boom 22R and the rear bottom of the machine body 2 is a lift cylinder 26 configured as a double-acting pressure cylinder. The lift cylinders 26 are simultaneously expanded and contracted to swing the boom 22L and the boom 22R upward and downward. The distal end of each of the boom 22L and the boom 22R pivotably supports an attachment bracket 27 so as to be rotatable about a transverse axis, and the rear surface of the bucket 23 is attached to each of the left and right attachment brackets 27.

Interposed between each of the attachment brackets 27 and a halfway portion adjacent to the distal end of each of the boom 22L and the boom 22R is a tilt cylinder 28 configured as a double-acting hydraulic cylinder. The bucket 23 swings (scoops and dumps) when the tilt cylinders 28 expand and contract.

The bucket 23 is detachably attached to the attachment brackets 27. Various tasks other than digging (or different digging tasks) can be performed by detaching the bucket 23 and attaching various attachments (a hydraulically-driven work tool having a hydraulic actuator to be described later) to the attachment brackets 27.

The machine body will be described next.

As shown in FIG. 1, the machine body 2 has a right frame portion 30, a left frame portion 31, a front frame portion 32, a bottom frame portion 33, and a top frame portion 34.

The right frame portion 30 configures a right portion of the machine body 2. The left frame portion 31 configures a left portion of the machine body 2. The front frame portion 32 configures the front portion of the machine body 2, and couples front portions of the right frame portion 30 and the left frame portion 31. The bottom frame portion 33 configures the bottom of the machine body 2, and couples the bottoms of the right frame portion 30 and the left frame portion 31. The top frame portion 34 forms a rear top portion of the machine body 2, and couples rear top portions of the right frame portion 30 and the left frame portion 31.

The right frame portion 30 and the left frame portion 31 each include a main frame 40, a track frame 41, a motor attachment portion 42, and a frame 43. The track frame 41 is attached to a lower portion of an outer side surface of the main frame 40 via an attachment member 44. The motor attachment portion 42 is provided in a rear top portion of the outer side surface of the main frame 40. The frame 43 is attached to a rear portion of the main frame 40.

The frame 43 swingably supports the booms 22L and 22R, and the like. The frame 43 has inner walls 43a, outer walls 43b, a front wall 43c, and a rear wall 43d. Each of the inner walls 43a and a corresponding one of the outer walls 43b face each other with a space provided therebetween in the machine body width direction. The outer walls 43b are positioned outside the inner walls 43a of the machine body. The front wall 43c is provided in a halfway portion of the main frame 40 in the machine body width direction and thus projects inward as well as outward from the main frame 40 of the machine body. The front wall 43c has a portion projecting outward from the machine body and configuring a fender covering a rear portion of the travel device 4. The front wall 43c couples a front portion of each of the inner walls 43a and a front portion of a corresponding one of the outer walls 43b. The rear wall 43d couples a rear portion of each of the inner walls 43a and a rear portion of a corresponding one of the outer walls 43b.

The top frame portion 34 includes a first plate member 34a and second plate members 34b. The first plate member 34a couples an upper portion of the right inner wall 43a and an upper portion of the left inner wall 43a. The first plate member 34a has an annular edge configuring an opening 35 and is provided behind the cabin 5. The annular edge configuring the opening 35 has a substantially rectangular shape.

The second plate members 34b extend backward from the left rear end and the right rear end of the first plate member 34a. The left second plate member 34b extends backward along the left inner wall 43a, and has a machine body outer end coupled to the left inner wall 43a. The right second plate member 34b extends backward along the right inner wall 43a, and has a machine body outer end coupled to the right inner wall 43a. The left second plate member 34b and the right second plate member 34b are inclined downward toward the rear end. The top frame portion 34 has a third plate member 34c. The third plate member 34c extends downward from the front end of the first plate member 34a.

Figure 2:
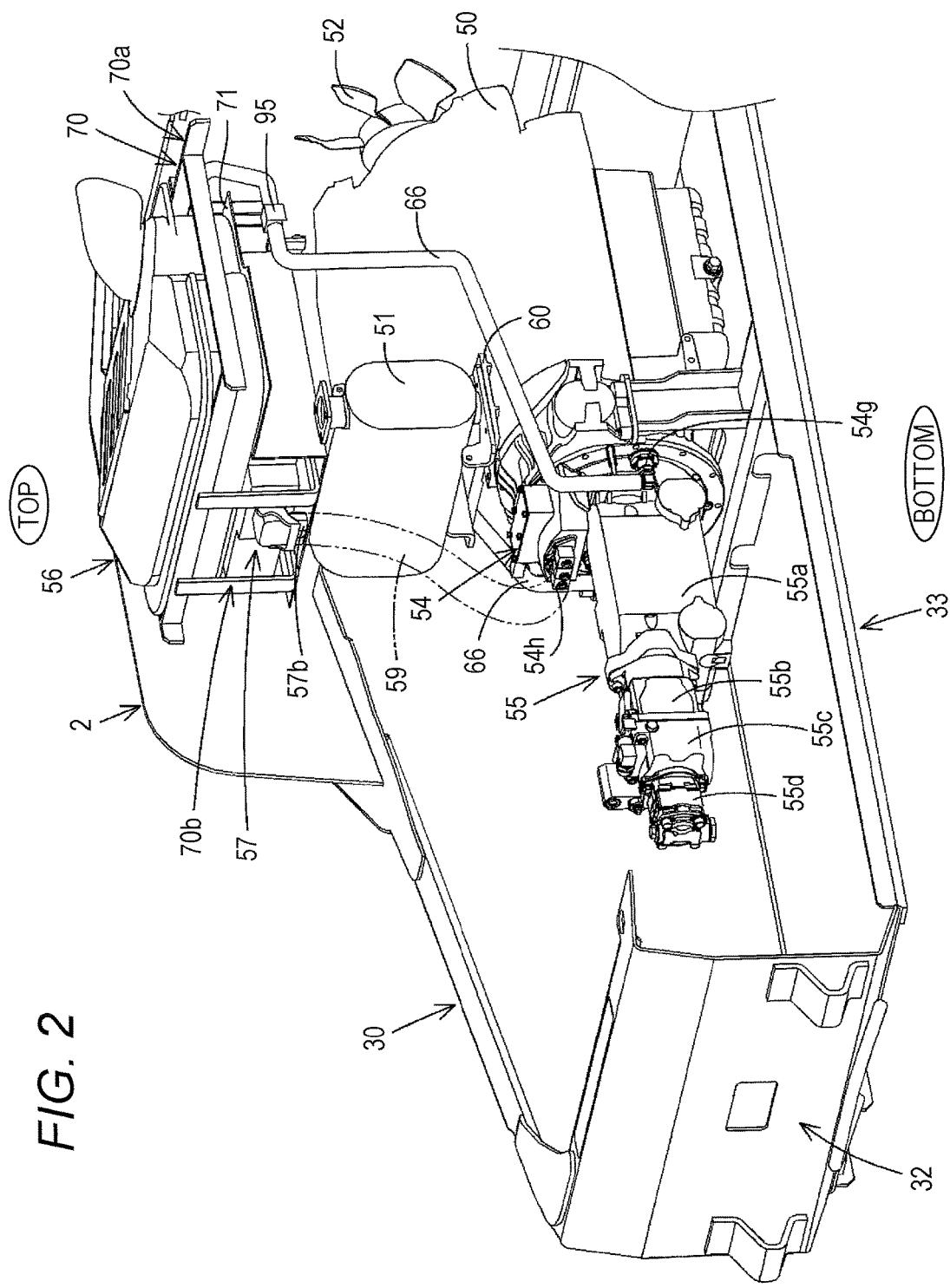
FIG. 2 is a perspective view of disposition of instruments (devices).
Figure 3:
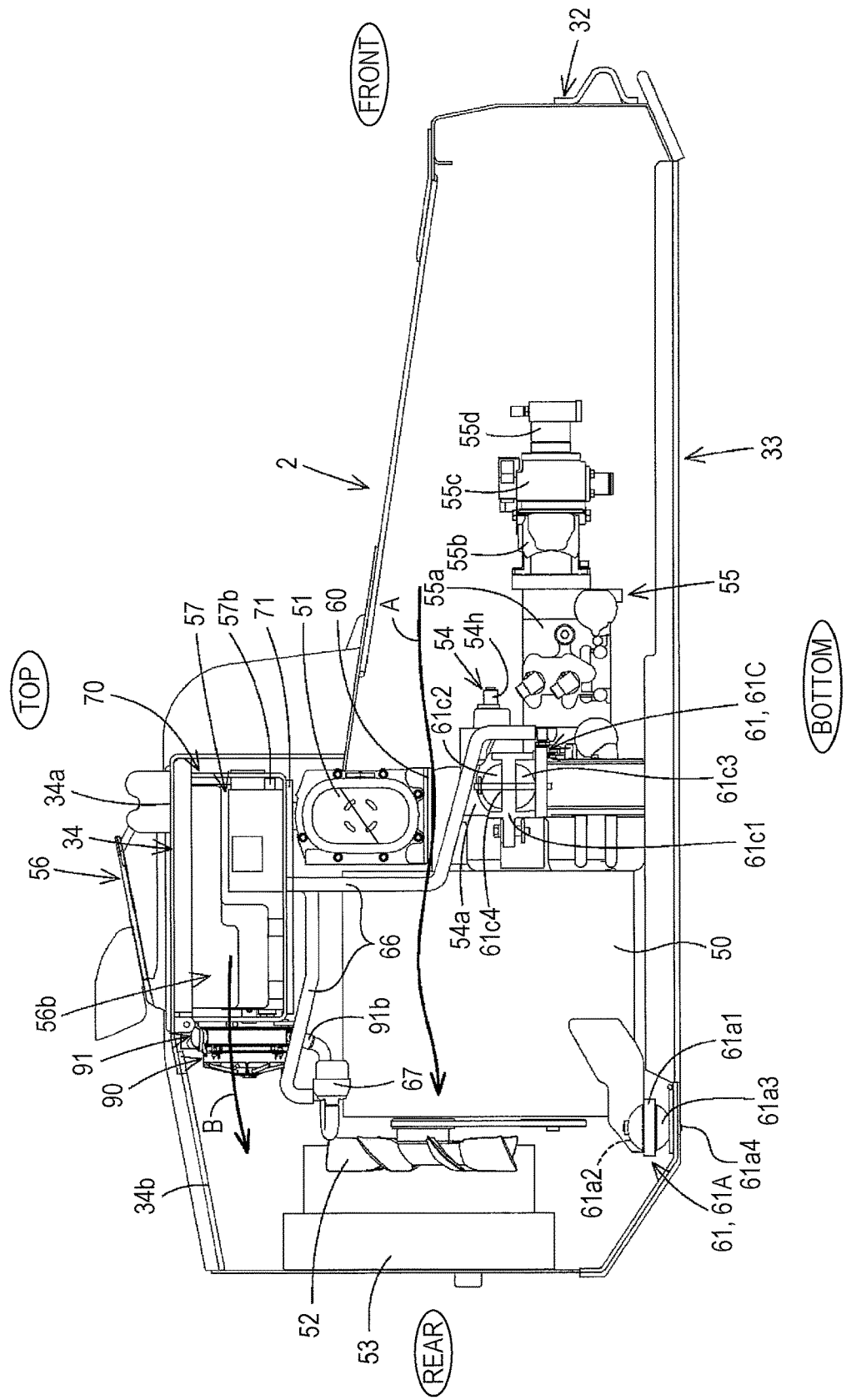
FIG. 3 is a right side view of the interior of the machine body.

As shown in FIGS. 2 and 3, the machine body 2 is provided with a diesel engine (engine) 50, a particulate removal device 51, a cooling fan 52, a radiator 53, a rotary electrical device 54, and a driving device 55 (an actuator 55). For easier description, the cooling fan 52 and the radiator 53 may be referred to as a "second cooling fan 52" and a "second radiator 53", respectively.

The particulate removal device 51 is configured to capture minute particles containing harmful substances in exhaust air (exhaust gas) from the engine 50, and is exemplified by a diesel particulate filter (DPF). The particulate removal device 51 is disposed at the upper front end of the engine 50. The engine 50 is provided, at the upper front end, with a support member 60 such as a bracket, and the support member 60 supports the particulate removal device 51 laterally disposed (to have a longitudinal side in the machine body width direction). The particulate removal device 51 is configured to burn and remove minute particulates, and at least its internal temperature reaches 600° C. or more during burning. The second cooling fan 52 is configured to be driven by the engine 50 to rotate. The second cooling fan 52 is configured to rotate to generate an air flow from ahead to behind of the second cooling fan 52 so as to cool the engine 50 with the air flow. The second radiator 53 is provided behind the second cooling fan 52 and is configured to cool cooling water of the engine 50.

The rotary electrical device 54 is configured as a generator, a motor, or a motor-generator. The rotary electrical device according to the present embodiment is configured as the motor-generator. The rotary electrical device 54 is provided ahead of the engine 50.

The driving device 55 is configured to be driven by the engine 50 and/or the rotary electrical device 54 and output motive power mainly for work. Specifically, the driving device 55 is configured as a hydraulic device (a hydraulic actuator). The hydraulic device 55 includes a plurality of pumps configured to supply a hydraulic instrument mounted on the work machine with hydraulic oil. The hydraulic device 55 is provided ahead of the rotary electrical device 54. The plurality of pumps included in the hydraulic device 55 is exemplified by a first pump 55*a*, a second pump 55*b*, a third pump 55*c*, and a fourth pump 55*d*.

The first pump 55*a* is a hydraulic pump configuring part of a hydrostatic continuously variable transmission (HST). The second to fourth pumps 55*b* to 55*d* are each configured as a constant capacity gear pump. The second pump 55*b* is a hydraulic pump configured to drive a hydraulic actuator installed in the work implement 3 and a hydraulic actuator of a hydraulic attachment attached to the work implement 3. The third pump 55*c* is a hydraulic pump configured to increase hydraulic oil to be supplied to the hydraulic actuator. The fourth pump 55*d* is a hydraulic pump configured to supply pilot oil and supplement a hydraulic circuit of the HST with hydraulic oil.

The machine body 2 is provided with a battery unit 56 and an electric power control device 57 (an electric power controller 57). The battery unit 56 (a battery 56*a*) is configured to be charged with electric power generated by the rotary electrical device 54 and supply the rotary electrical device 54 and the like with the charged electric power. The battery unit 56 is provided on the left of, on the right of, above, below, behind, or the like of the engine 50. That is, the battery unit 56 is provided adjacent to the engine 50 so as to receive heat generated by the engine 50. The battery unit 56 according to the present embodiment is provided immediately above the engine 50. The electric power control device 57 includes an inverter configured to convert DC power to AC power, and a converter configured to convert AC power to DC power. The electric power control device 57 is provided above the engine 50.

Figure 4:
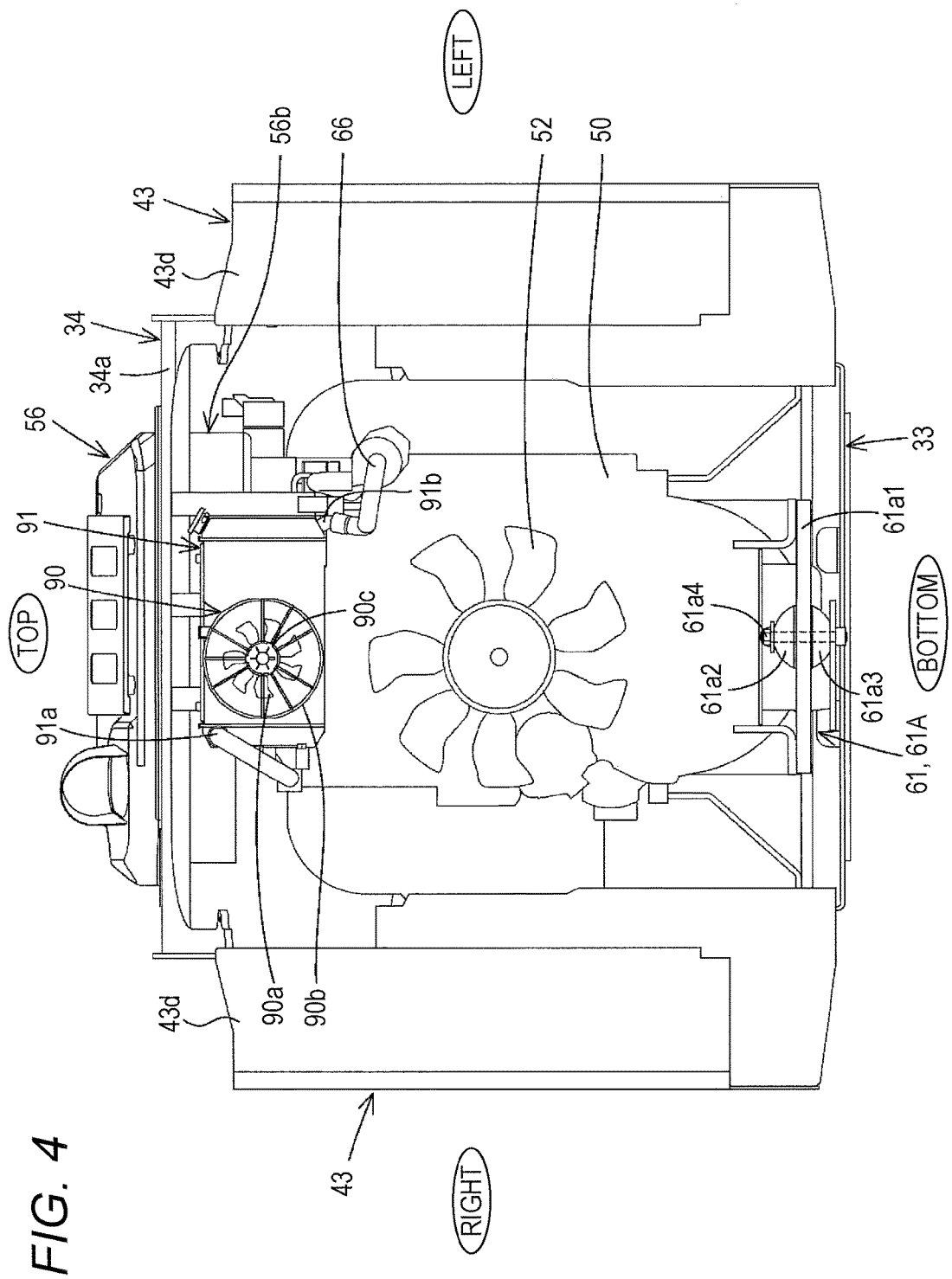
FIG. 4 is a rear view of the interior of the machine body.
Figure 5:
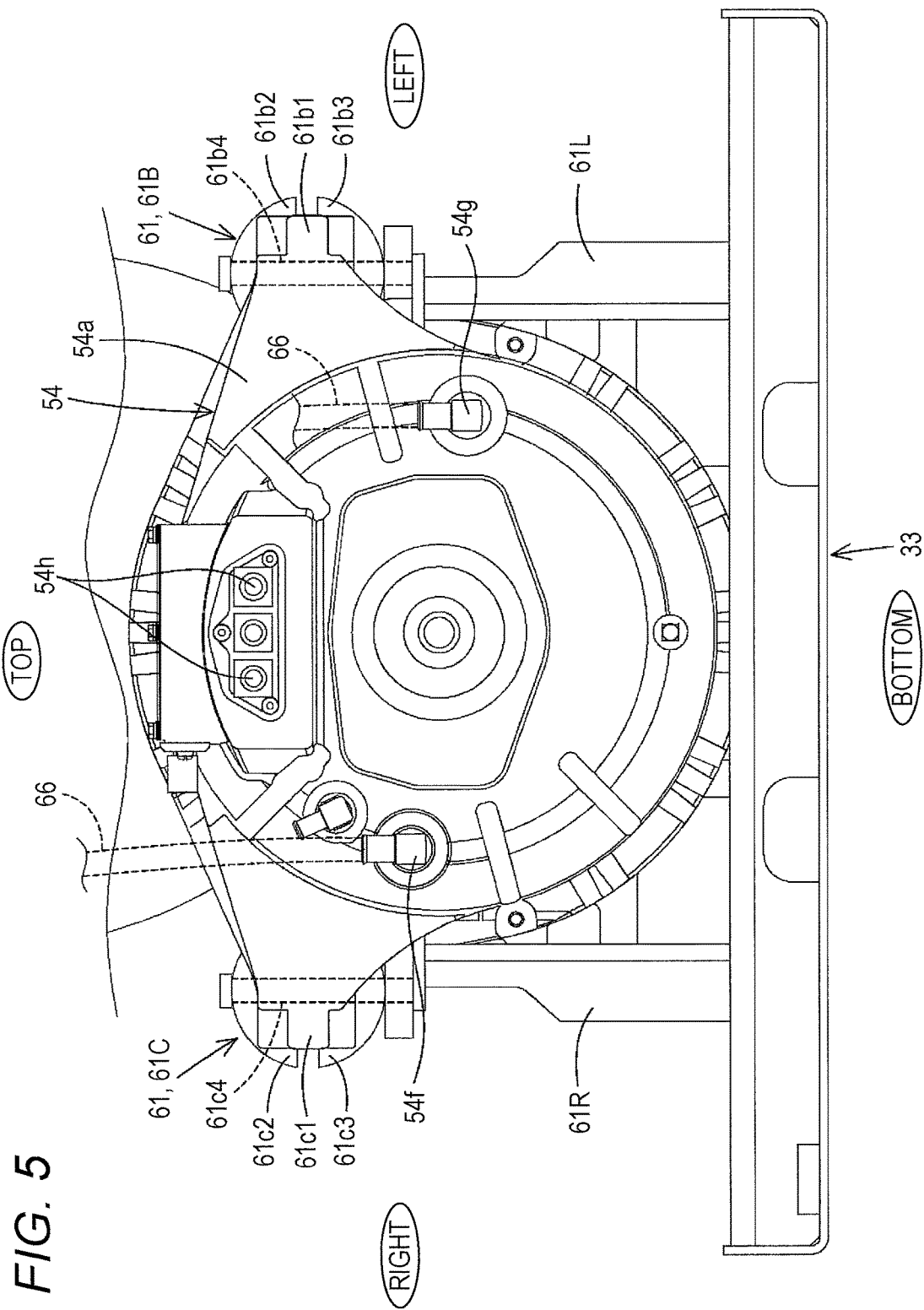
FIG. 5 is a front view of support of a rotary electrical device.

As shown in FIGS. 3 to 5, the engine 50 and the rotary electrical device 54 are supported by the bottom frame portion 33 of the machine body 2 with use of a plurality of mount devices 61. The mount devices 61 include a first mount (first mount device) 61A, a second mount (second mount device) 61B, and a third mount (third mount device) 61C.

The first mount 61A is disposed below a rear portion of the engine 50. The first mount 61A is disposed in a central portion in the width direction of the engine 50. The first mount 61A includes a support plate 61*a*1, an upper elastic body 61*a*2, a lower elastic body 61*a*3, and a support piece (stud bolt) 61*a*4. The support plate 61*a*1 is fixed to the rear portion of the engine 50 and projects backward. The upper elastic body 61*a*2 is made of an elastic material and is provided above the support plate 61*a*1. The lower elastic body 61*a*3 is made of an elastic material and is provided below the support plate 61*a*1. The support piece 61*a*4 stands on the bottom frame portion 33 at a position behind the engine 50, and the upper elastic body 61*a*2 and the lower elastic body 61*a*3 are attached to the support piece 61*a*4. The first mount 61A thus supports the rear portion of the engine 50.

The second mount 61B is disposed on the left of a housing (also referred to as a motor housing) 54*a* of the rotary electrical device 54. The second mount 61B includes a support plate 61*b*1, an upper elastic body 61*b*2, a lower elastic body 61*b*3, and a support piece (stud bolt) 61*b*4. The support plate 61*b*1 is fixed to the left side surface of the housing 54*a* and projects leftward. The upper elastic body 61*b*2 is made of an elastic material and is provided above the support plate 61*b*1. The lower elastic body 61*b*3 is made of an elastic material and is provided below the support plate 61*b*1. The support piece 61*b*4 is supported by a left bracket 62L standing on the bottom frame portion 33 at a position on the left of the housing 54*a*. The upper elastic body 61*b*2 and the lower elastic body 61*b*3 are attached to the support piece 61*b*4. The second mount 61B thus supports one of the booms 22L and 22R on one side (the left) of the housing 54*a*.

The third mount 61C is disposed on the right of the housing 54*a* of the rotary electrical device 54. The third mount 61C includes a support plate 61*c*1, an upper elastic body 61*c*2, a lower elastic body 61*c*3, and a support piece (stud bolt) 61*c*4. The support plate 61*c*1 is fixed to the right side surface of the housing 54*a* and projects rightward. The upper elastic body 61*c*2 is made of an elastic material and is provided above the support plate 61*c*1. The lower elastic body 61*c*3 is made of an elastic material and is provided below the support plate 61*c*1. The support piece 61*c*4 is supported by a right bracket 62R standing on the bottom frame portion 33 at a position on the right of the housing 54*a*. The upper elastic body 61*c*2 and the lower elastic body 61*c*3 are attached to the support piece 61*c*4. The third mount 61C thus supports one of the lateral sides of the housing 54*a*.

Accordingly, the first mount 61A supports the rear portion of the engine 50, and the second mount 61B and the third mount 61C support the rotary electrical device 54. In other words, the structures of the engine 50 and the rotary electrical device 54 are supported by the first mount 61A, the second mount 61B, and the third mount 61C.

The work machine 1 is configured to drive the hydraulic device 55 with motive power of the engine 50, drive the hydraulic device 55 with both the engine 50 and the rotary electrical device 54, and actuate the rotary electrical device 54 with motive power of the engine 50 to generate electric power. The work machine is configured to transmit motive power in accordance with a parallel hybrid system. Described below are motive power transmission structures of the engine 50 and the rotary electrical device 54.

Figure 6:
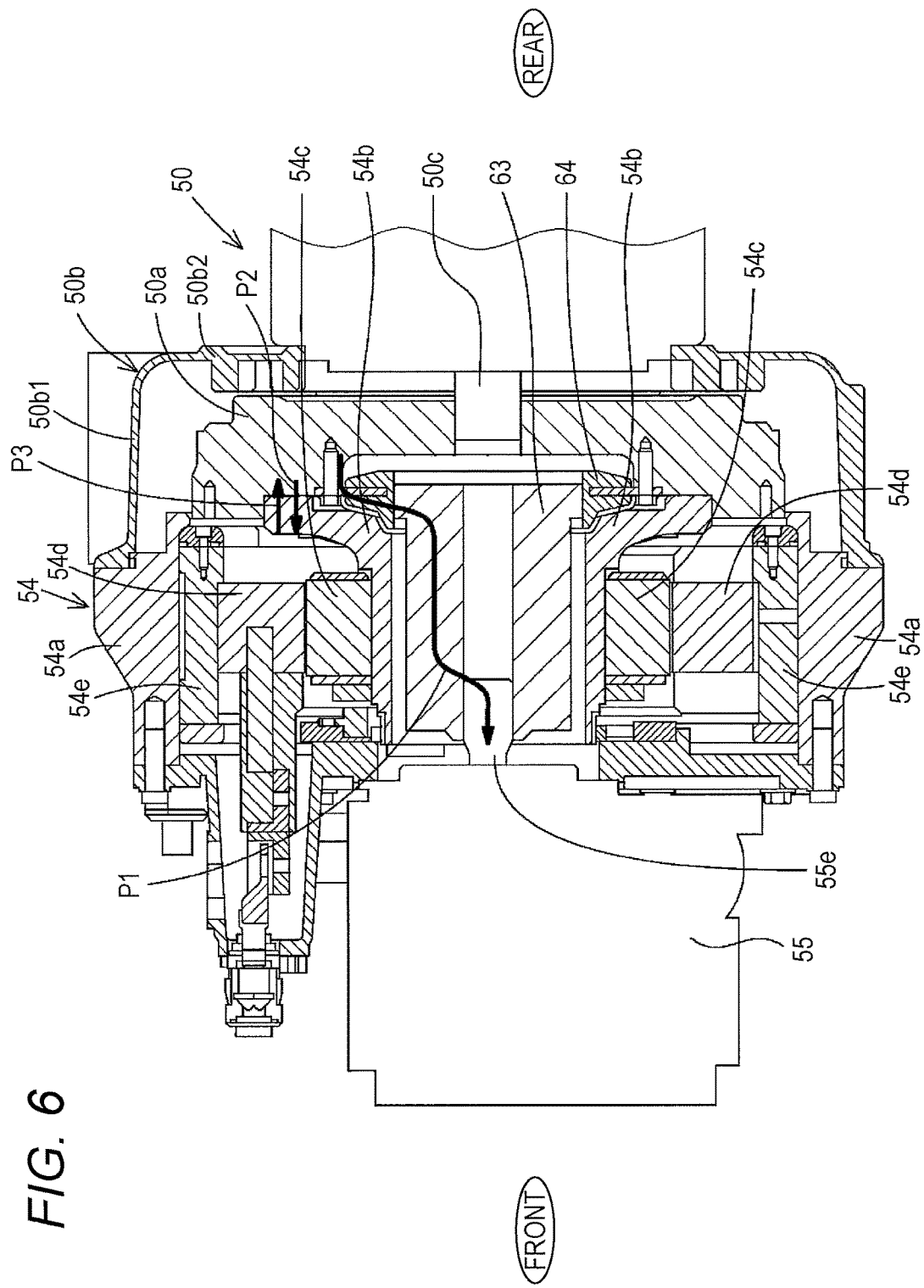
FIG. 6 is a sectional view of the interior of the rotary electrical device.

As shown in FIG. 6, the engine 50 is provided, in a front portion, with a flywheel housing 50*b* accommodating a flywheel 50*a* in a substantially circular disc shape. The flywheel housing 50*b* has an outer peripheral portion 50*b*1 covering the outer circumference of the flywheel 50*a*, and a side wall 50*b*2 covering a rear portion of the flywheel 50*a* and fixed to the engine 50. The side wall 50*b*2 is provided, on the opposite portion (front portion), with the housing 54*a* that is attached to the outer peripheral portion 50*b*1. The rear portion of the flywheel 50*a* is coupled with a crank shaft 50*c* of the engine 50.

The rotary electrical device 54 is configured as a motor-generator that is driven in a manner of a three-phase AC synchronous motor of a permanent magnet embedded type.

The rotary electrical device 54 includes the housing 54*a*, a coupling portion 54*b* coupled to the flywheel 50*a*, a rotor 54*c* fixed to the coupling portion 54*b*, a stator 54*d* provided to the rotor 54*c*, and a water jacket 54*e* provided outside the stator 54*d*.

The coupling portion 54*b* has a tubular shape and a rear end attached to the flywheel 50*a*. The coupling portion 54*b* is provided therein with an intermediate shaft 63. The intermediate shaft 63 has a rear end provided with a coupling member 64 that has an exterior connected to the flywheel 50*a*. The intermediate shaft 63 has a front end connected with a drive shaft 55*e* of the hydraulic device 55.

When the engine 50 is driven, rotary motive power of the crank shaft 50*c* of the engine 50 is transmitted to the flywheel 50*a* to rotate the flywheel 50*a*. As indicated by arrow P1 in FIG. 6, rotary motive power of the flywheel 50*a* is transmitted from the coupling member 64 to the intermediate shaft 63 and is then transmitted from the intermediate shaft 63 to the drive shaft 55e of the hydraulic device 55 so as to drive the hydraulic device 55.

As indicated by arrow P2 in FIG. 6, rotary motive power of the flywheel 50a is transmitted to the rotor 54c by way of the coupling portion 54b. Rotary motive power of the engine 50 is thus transmitted to the rotor 54c (coupling portion 54b) to actuate the rotary electrical device 54 functioning as a generator. Electric power stored in the battery unit 56 (the battery 56a) is supplied to the stator 54d to rotate the rotor 54c. As indicated by arrow P3 in FIG. 6, rotary motive power of the rotor 54c can be transmitted to the flywheel 50a by way of the coupling portion 54b. The rotary electrical device 54 can thus be actuated as a motor to assist the engine 50.

Figure 7:
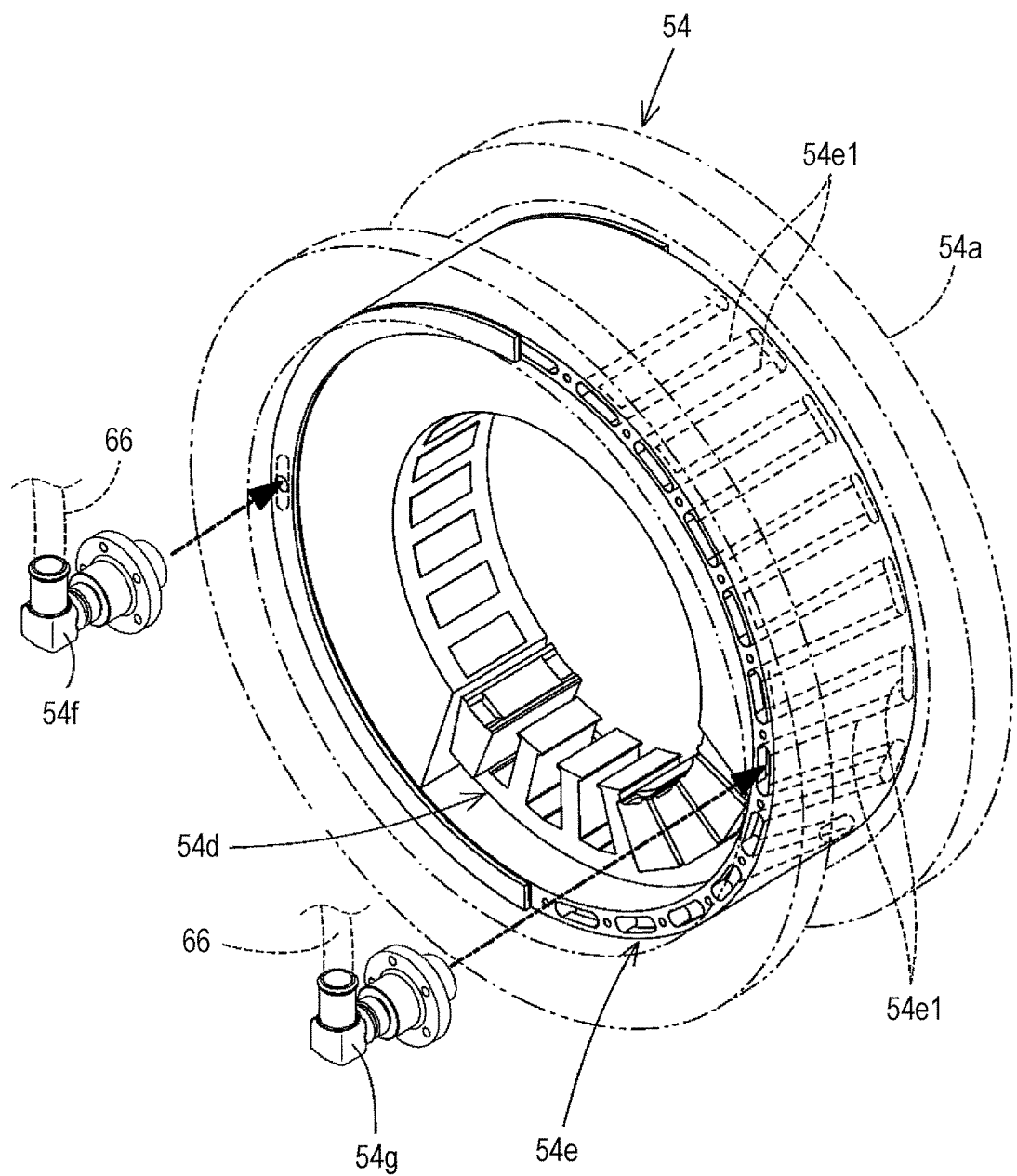
FIG. 7 is an explanatory view of a water cooling structure.

FIG. 7 shows part of a cooling structure of the rotary electrical device 54. As shown in FIG. 7, the water jacket 54e allows cooling water to flow therethrough to cool the interior of the rotary electrical device 54. The water jacket 54e has a tubular shape and is provided between the housing 54a and the stator 54d.

The water jacket 54e is made of an aluminum alloy having high thermal conductivity or the like to have an annular shape. The water jacket 54e is provided therein with a zig-zag flow passage 54e1 in the circumferential direction and in the axial direction. The flow passage 54e1 axially penetrates the water jacket 54e and has a portion communicating to the water jacket 54e. The housing 54a has a front surface provided with a supply portion 54f communicating to the flow passage 54e1 of the water jacket 54e and provided with a discharge portion 54g. The supply portion 54f and the discharge portion 54g are each attached with a pipe member (pipe) 66 allowing cooling water to flow therethrough. Cooling water is caused to flow in the pipe member 66 and pass through the flow passage 54e1 of the water jacket 54e to cool the rotary electrical device 54. The cooling structure of the rotary electrical device 54 in FIG. 7 is merely exemplary, and the rotary electrical device 54 can have any structure to cool the interior thereof.

Described next are support structures of electric instruments such as the battery unit 56 and the electric power control device 57. As shown in FIGS. 2 and 3, the machine body 2 is provided, in the rear portion, with a support frame 70. Specifically, the support frame 70 is provided to the top frame portion 34 of the machine body 2. The support frame 70 supports the battery unit 56 and the electric power control device 57 at a position above the engine 50.

Figure 8:
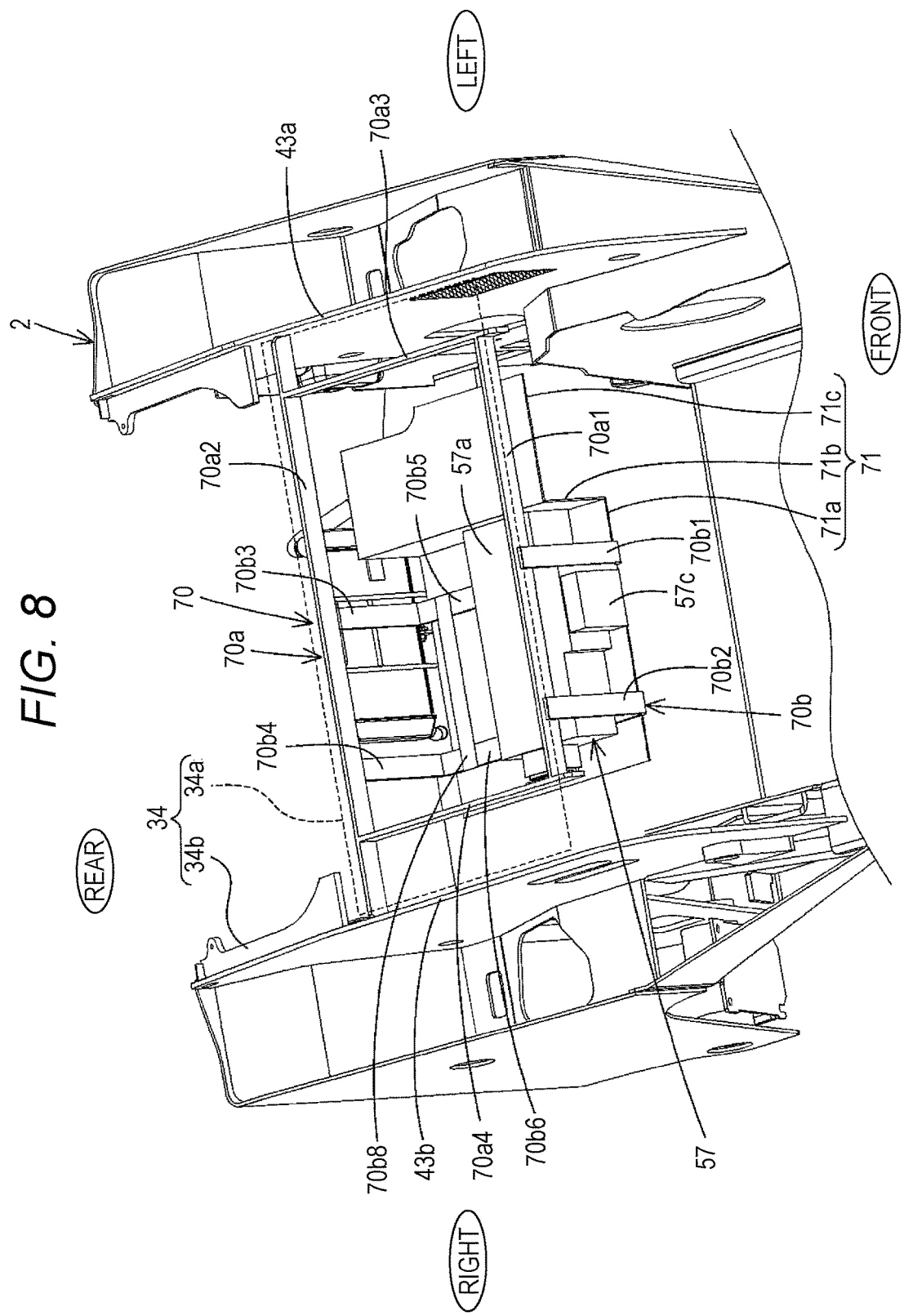
FIG. 8 is an upper front view of a support frame.
Figure 9:
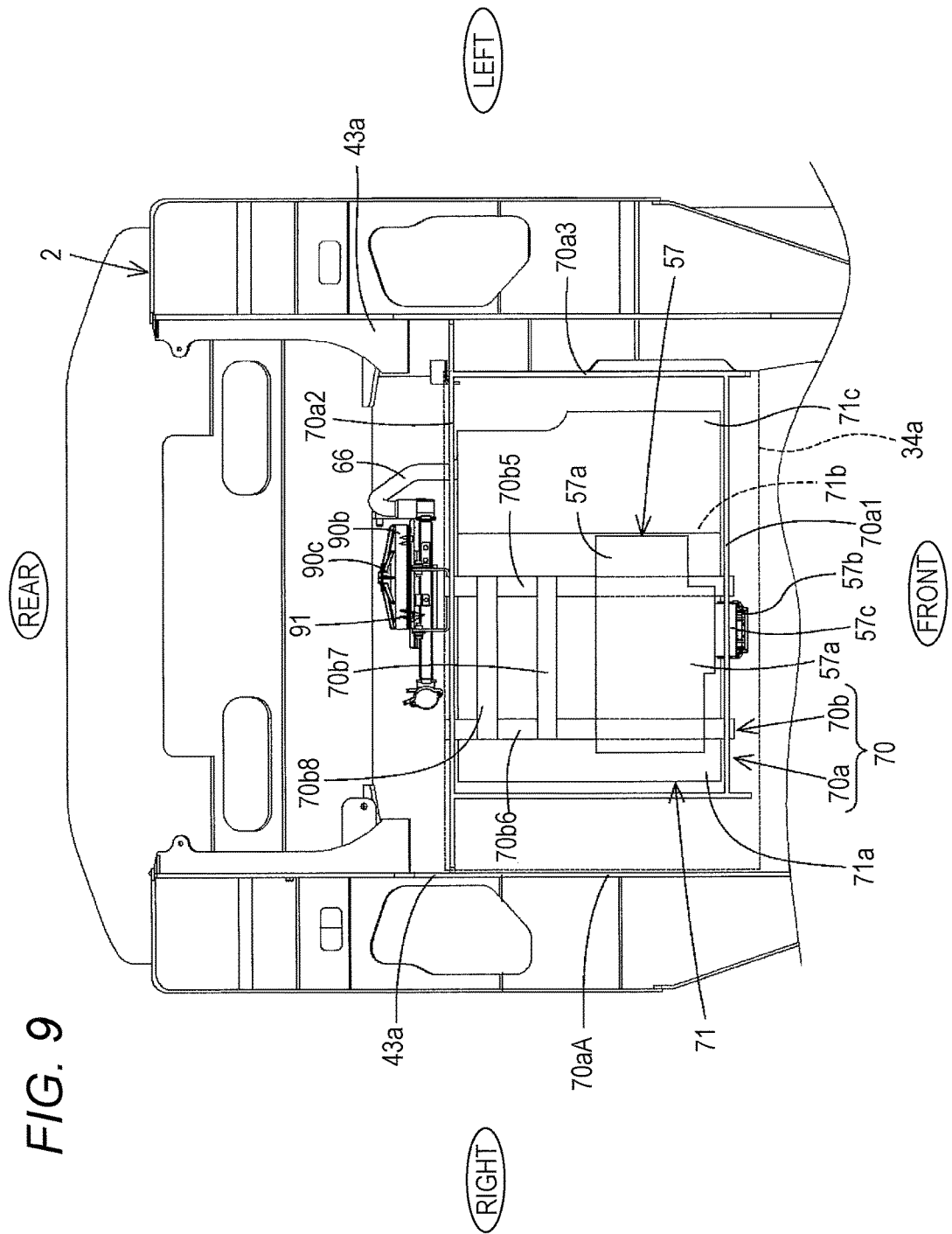
FIG. 9 is a plan view of the periphery of the support frame.

As shown in FIGS. 8 and 9, the support frame 70 includes a first frame body 70a attached to the lower surface of the top frame portion 34 (first plate member 34a), and a second frame body 70b hanging from the first frame body 70a.

The first frame body 70a includes a front plate 70a1, a rear plate 70a2, a left plate 70a3, and a right plate 70a4. The front plate 70a1 is disposed between the left inner wall 43a and the right inner wall 43a and is attached to a front portion of the first plate member 34a. The rear plate 70a2 is disposed between the left inner wall 43a and the right inner wall 43a and is attached to a rear portion of the first plate member 34a. The left plate 70a3 couples a left portion of the front plate 70a1 and a left portion of the rear plate 70a2. The right plate 70a4 couples a right portion of the front plate 70a1 and a right portion of the rear plate 70a2.

The second frame body 70b includes a first front plate 70b1, a second front plate 70b2, a first rear plate 70b3, a second rear plate 70b4, a first coupling plate 70b5, and a second coupling plate 70b6. The first front plate 70b1 has an upper end fixed to a first one of the portions (left portion) of the front plate 70a1, and the second front plate 70b2 has an upper end fixed to a second one of the portions (right portion) of the front plate 70a1. The first rear plate 70b3 has an upper end fixed to a first one of portions (a left portion) of the rear plate 70a2, and the second rear plate 70b4 has an upper end fixed to a second one of the portions (a right portion) of the rear plate 70a2. The first coupling plate 70b5 couples the lower end of the first front plate 70b1 and the lower end of the first rear plate 70b3. The second coupling plate 70b6 couples the lower end of the second front plate 70b2 and the second rear plate 70b4. The support frame 70 includes the first front plate 70b1, the second front plate 70b2, the first rear plate 70b3, the second rear plate 70b4, the first coupling plate 70b5, and the second coupling plate 70b6, to have a basket shape.

The second frame body 70b is desired to have a bottom raising member (a first bottom raising portion 70b7 and a second bottom raising portion 70b8). The first bottom raising portion 70b7 couples the first coupling plate 70b5 and the second coupling plate 70b6. The second bottom raising portion 70b8 couples the first coupling plate 70b5 and the second coupling plate 70b6 at a position distant from the first bottom raising portion 70b7.

Attached to the second frame body 70b is a shield plate 71 between the battery unit 56 and the top of the engine 50. The shield plate 71 configured by a plate member and is attached to the bottom of the second frame body 70b. The shield plate 71 is provided to inhibit, to some extent, direct transmission of heat (radiant heat) generated by the engine 50 to a battery case 56b of the battery unit 56. The shield plate 71 is also provided between a case 57a of the electric power control device 57 and the particulate removal device 51 to inhibit transmission of heat generated by the particulate removal device 51 to the electric power control device 57.

The shield plate 71 includes a bottom plate 71a, a standing plate 71b, and a top plate 71c. The bottom plate 71a is fixed to the bottom of the support frame 70, specifically, the first coupling plate 70b5 and the second coupling plate 70b6 of the second frame body 70b. The standing plate 71b stands upward from the end in the width direction of the bottom plate 71a. The top plate 71c is coupled to the standing plate 71b. The bottom plate 71a, the standing plate 71b, and the top plate 71c are substantially equal in anteroposterior length to the first coupling plate 70b5 and the second coupling plate 70b6.

The electric power control device 57 has a rectangular outer shape and is supported by the support frame 70 having the basket shape. In other words, the electric power control device 57 is accommodated in the support frame 70 having the basket shape. The case 57a of the electric power control device 57 is placed to span the first coupling plate 70b5 and the second coupling plate 70b6 positioned immediately above the particulate removal device 51. The electric power control device 57 supported by the support frame 70 has a connector (connecting portion) 57b positioned in a front portion of the support frame 70. The connector 57b projects downward toward the rotary electrical device 54. The connector 57b of the electric power control device 57 is provided therebelow with a connector 54h of the rotary electrical device 54. The connector 54h of the rotary electrical device 54 is connected with a cable 59 that can be inserted to the connector 57b from below. The connector 57b directed downward thus inhibits dust and dirt from entering the connector 57b. The connector 54h of the rotary electrical device 54 is provided below the connector 57b of the electric power control device 57 to enable a short connection length and relatively easy wiring.

Figure 10:
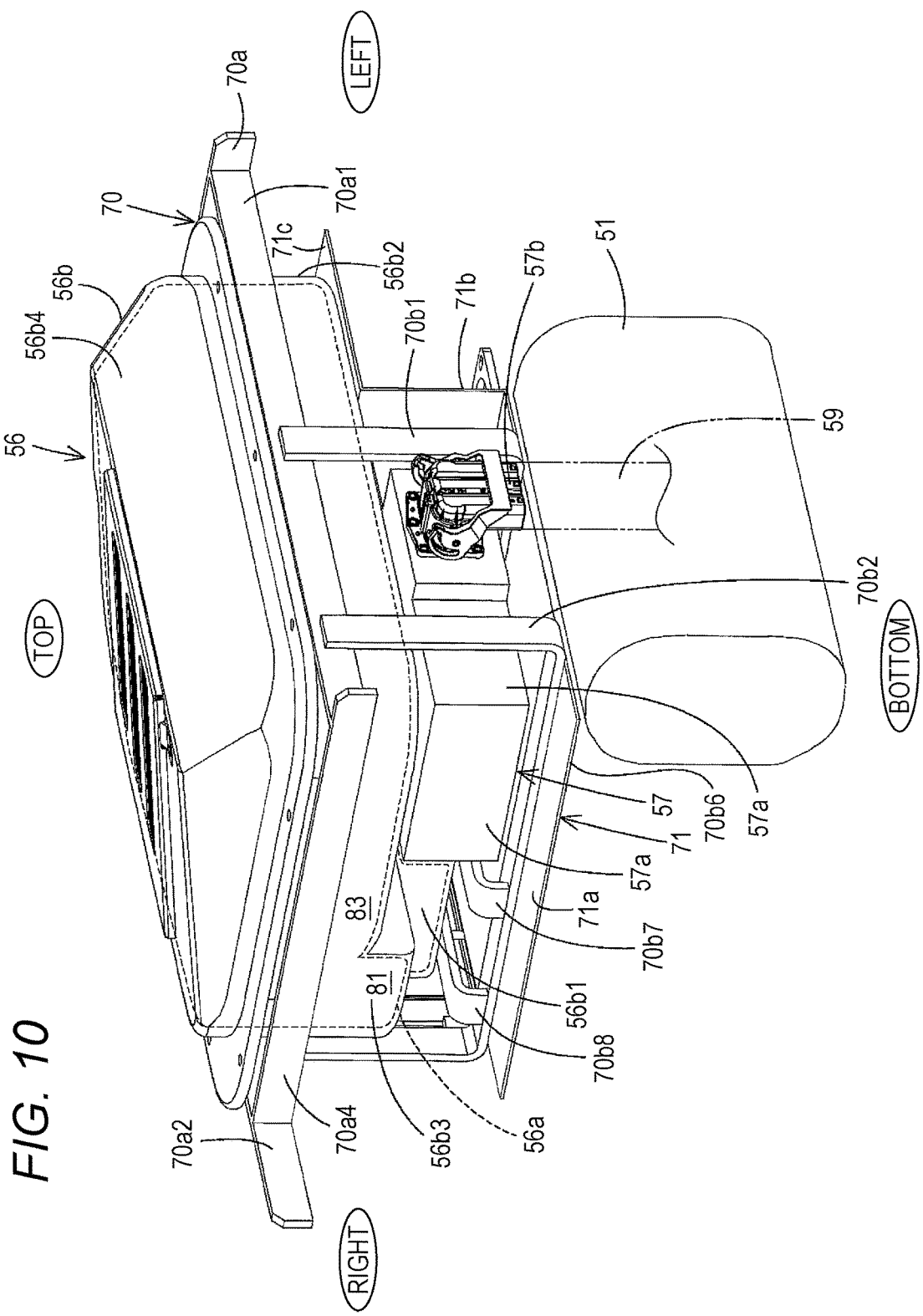
Figure 11:
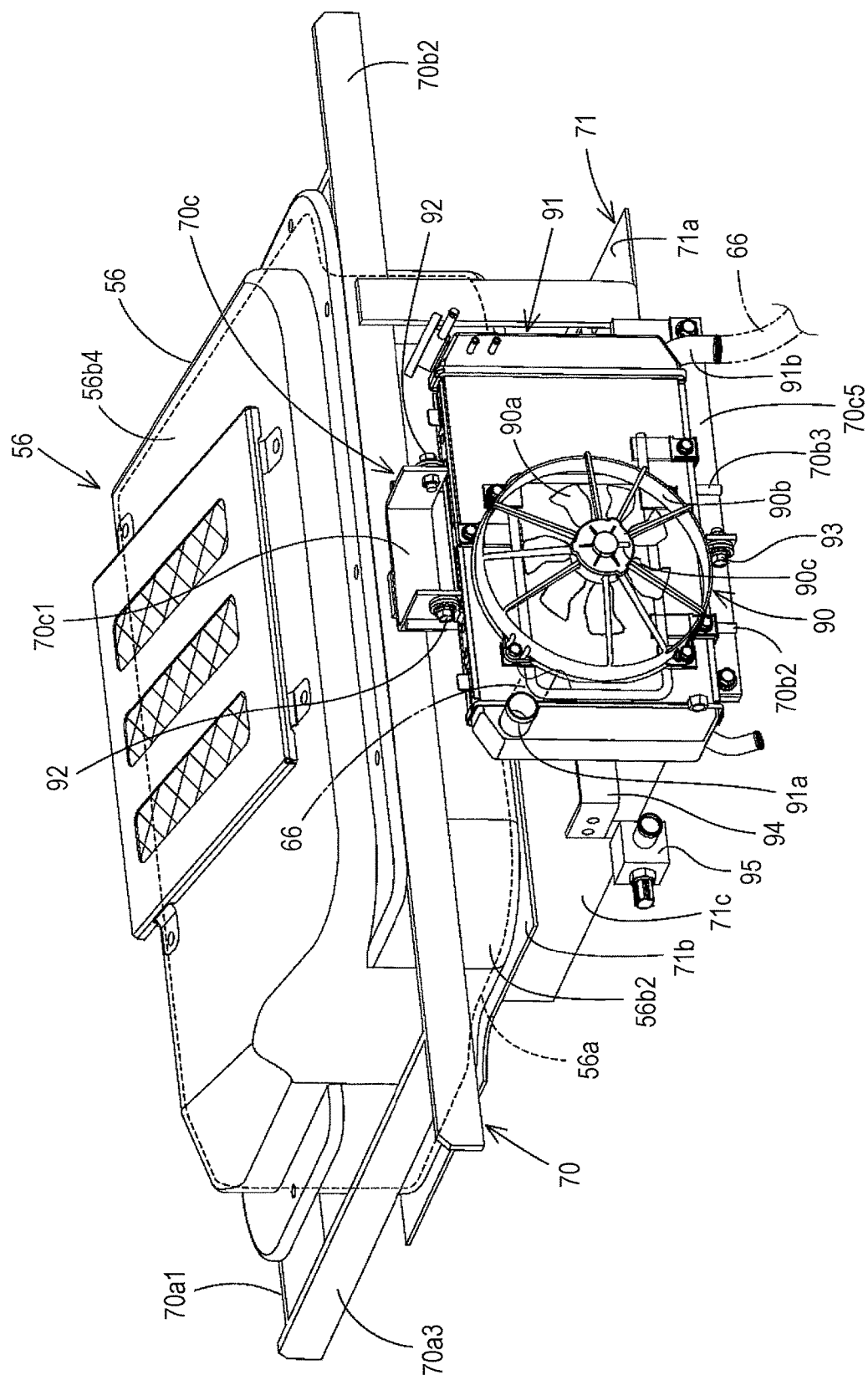

As shown in FIGS. 10 and 11, the battery unit 56 has a rectangular outer shape and is supported by the support frame 70 having the basket shape, like as the electric power control device 57. In other words, the battery unit 56 is accommodated in the support frame 70 having the basket shape. At least part of the battery unit 56 is disposed above the electric power control device 57. Specifically, the portion of the battery unit 56 positioned above the particulate removal device 51 is positioned above the electric power control device 57.

Figure 12:
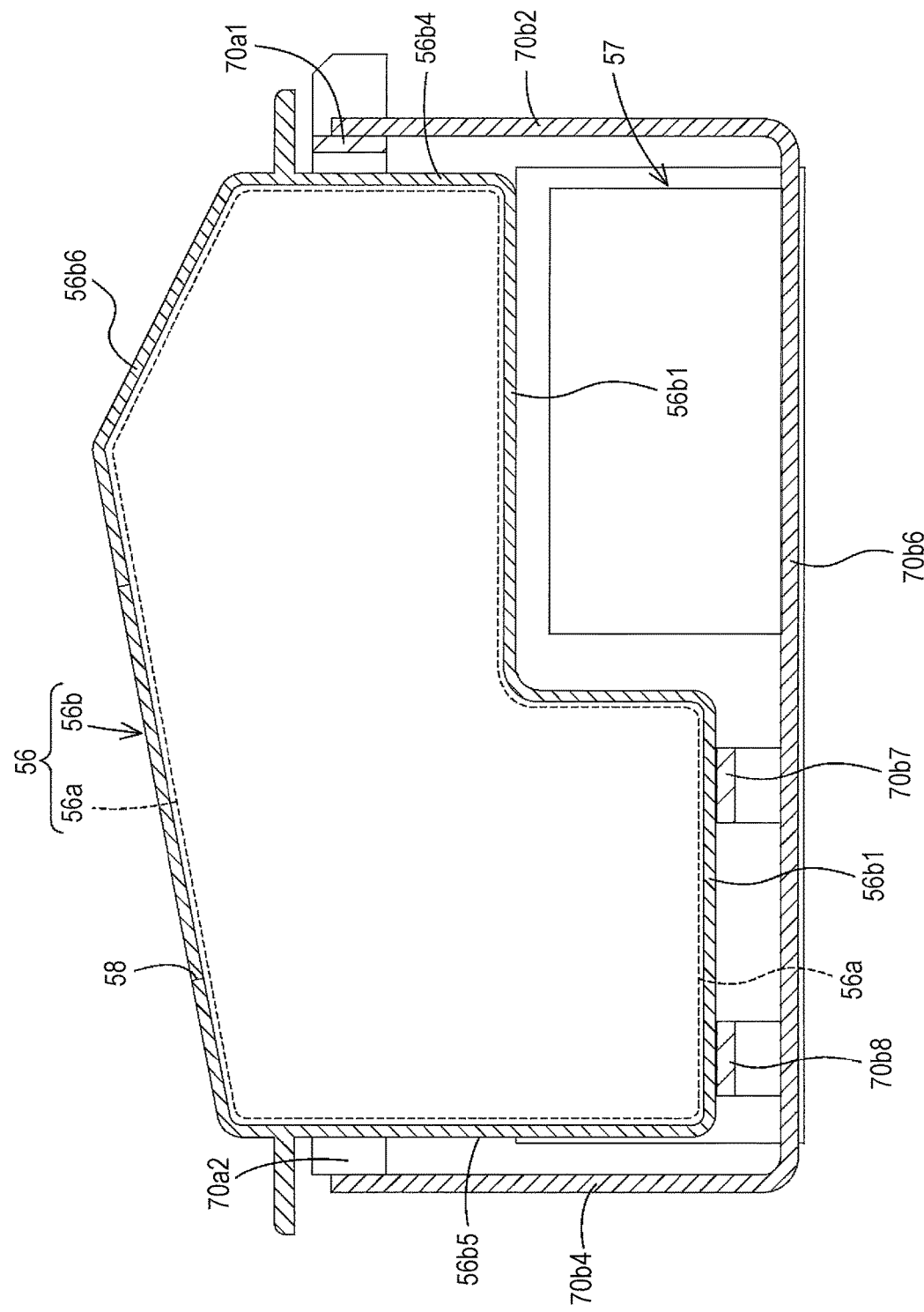
FIG. 12 is a view of the interior of the battery unit.

As shown in FIG. 12, the battery unit 56 includes the battery 56a and the battery case 56b accommodating the battery 56a. The battery 56a functions as an electric storage configured to be charged with electric power or discharge electric power, and is embodied as a nickel-metal hydride secondary battery. The battery 56a can be embodied as a lithium ion secondary battery or a capacitor.

As shown in FIGS. 10 to 12, the battery case 56b has a rectangular shape, and includes a bottom 56b1, a first wall 56b2, a second wall 56b3, a third wall 56b4, a fourth wall 56b5, and a top 56b6.

The first wall 56b2 stands upward from the left end of the bottom 56b1 (see FIG. 11 and the like). The second wall 56b3 stands upward from the right end of the bottom 56b1 (see FIG. 10 and the like). The third wall 56b4 stands upward from the front end of the bottom 56b1. The fourth wall 56b5 stands upward from the rear end of the bottom 56b1. The top 56b6 is positioned above the second wall 56b3, the third wall 56b4, and the fourth wall 56b5 to cover the second wall 56b3, the third wall 56b4, and the fourth wall 56b5. The top 56b6 projects upward from the top frame portion 34. The top 56b6 is provided with an annular edge 58 configuring an opening. The edge allows outside air to enter the battery case 56b and allows air in the battery case 56b to be exhausted to the outside.

Figure 13:
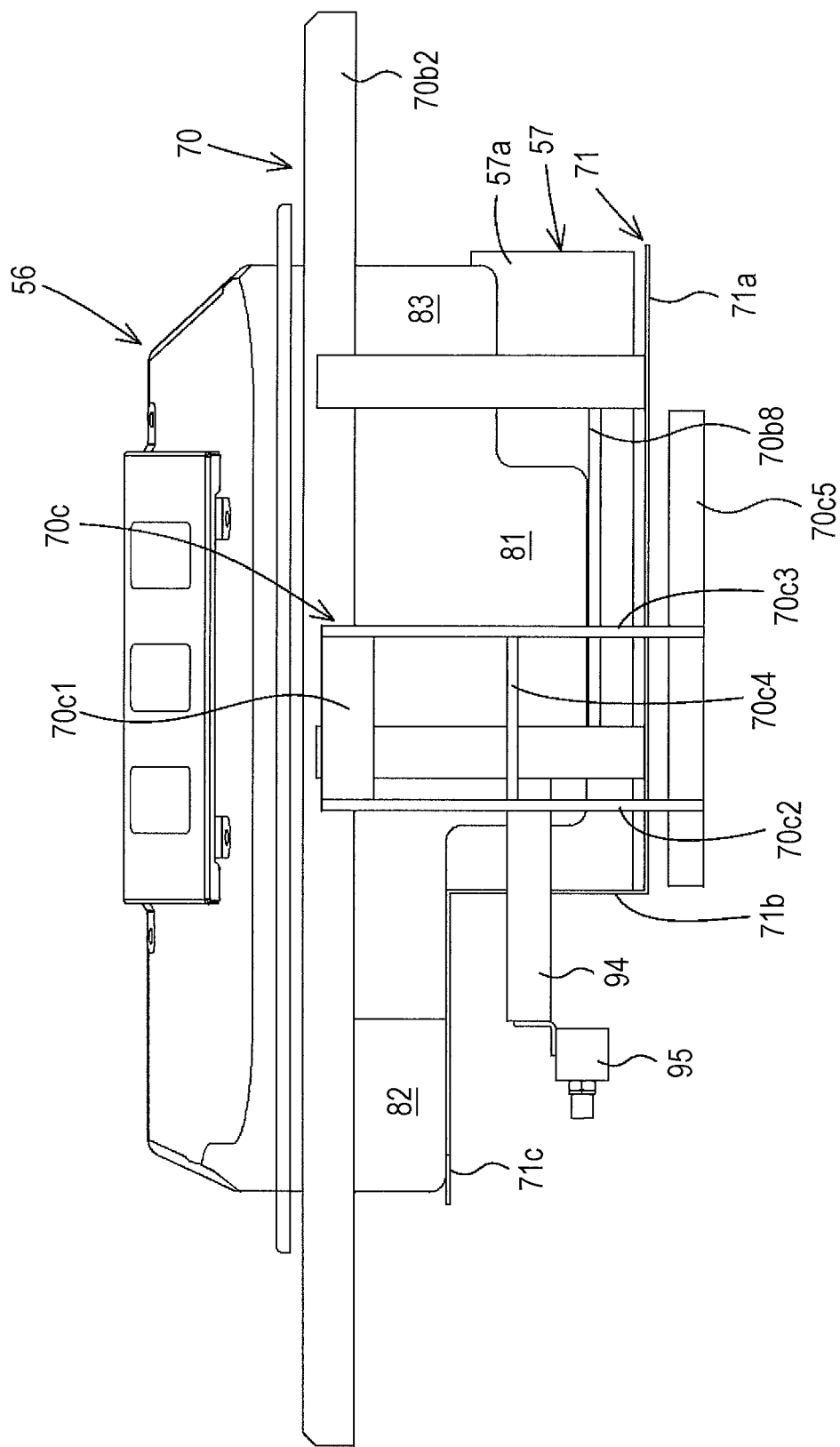
FIG. 13 is a rear view of the support frame in a state before the cooling fan is mounted.

As shown in FIG. 13, the battery case 56b has a thickness (height) varied between different regions. Specifically, the battery case 56b has a central rear region 81 that is positioned in a central portion in the width direction and in a rear portion, has the largest thickness, and is disposed (placed) on the first bottom raising portion 70b7 and the second bottom raising portion 70b8. The battery case 56b has a left region 82 that is positioned on the left of the central rear region 81, is thinner than the central rear region 81, and is disposed (placed) on the top plate 71c of the shield plate 71. The battery case 56b has a central front region 83 that is positioned ahead of the central rear region 81 and on the right of the left region 82, is thinner than the central rear region 81, and is disposed above the electric power control device 57 (above the case 57a).

As shown in FIGS. 3, 4, 9, and 11, the battery case 56b is provided adjacent thereto with a cooling fan 90. The cooling fan 90 is provided behind the battery case 56b in the present embodiment. For easier description, the cooling fan 90 will hereinafter be referred to as a "first cooling fan 90".

Figure 14:
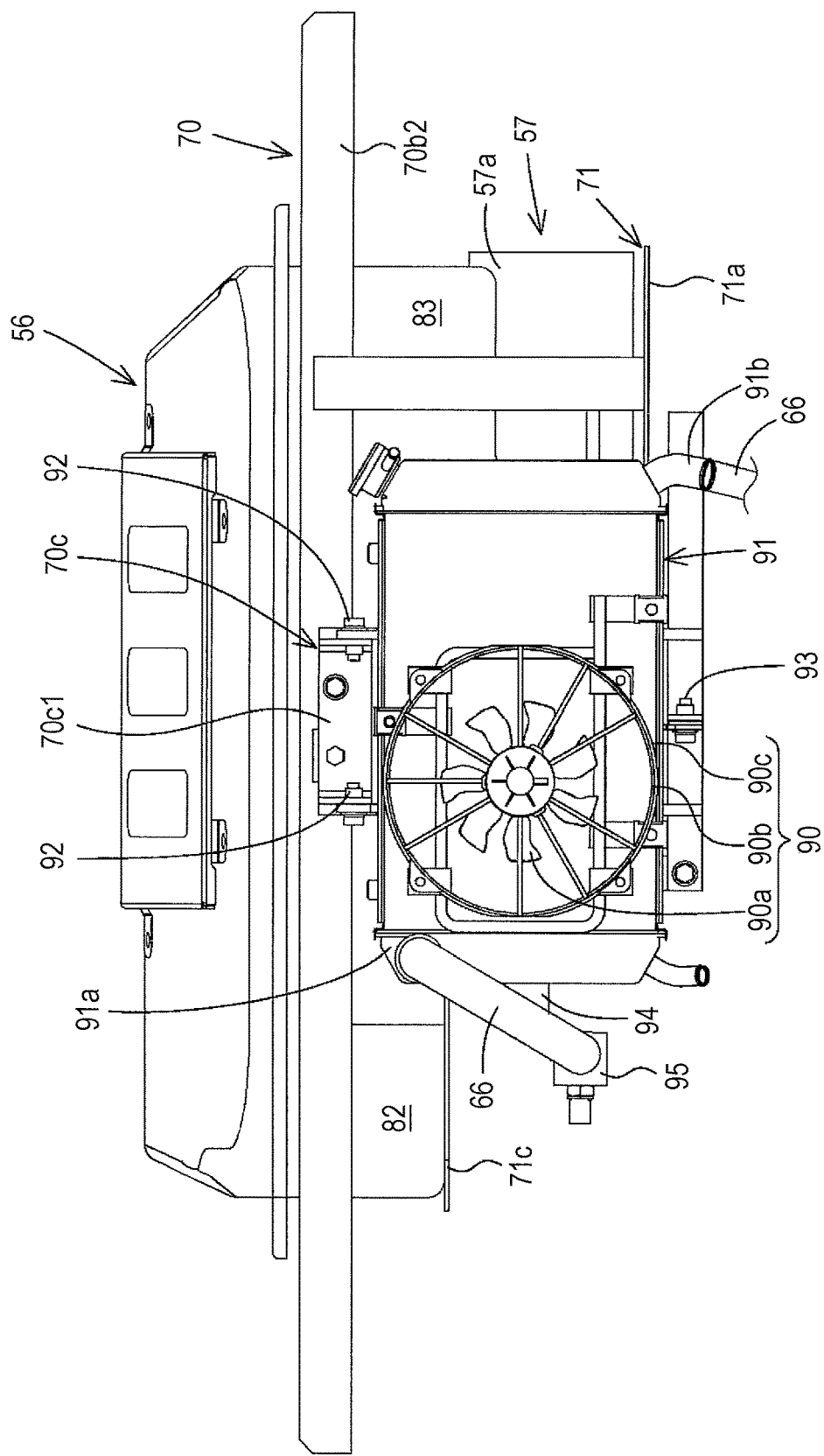
FIG. 14 is a rear view of the support frame in a state where the cooling fan is mounted.

As shown in FIGS. 13 and 14, the first cooling fan 90 is provided in the central rear region 81 and behind the fourth wall 56b5 of the battery case 56b. The first cooling fan 90 includes a fan 90a, a fan support portion 90b rotatably supporting the fan 90a, and a driving unit 90c provided in the fan support portion 90b and configured to drive to rotate the fan 90a. The fan 90a is rotated to generate an air flow from ahead (close to the battery case 56b) to behind. The driving unit 90c is configured as a motor or the like. The fan 90a is rotated to generate an air flow from ahead to behind to forcibly externally cool the battery case 56b.

The cooling fan 90 and the battery unit 56 are provided therebetween with a radiator 91. The radiator 91 cools the interior of the rotary electrical device 54 with cooling water. For easier description, the radiator 91 will hereinafter be referred to as a "first radiator 91".

The first radiator 91 includes a supply portion 91a for supply of cooling water and a discharge portion 91b for discharge of cooling water. The supply portion 91a is connected with the pipe member 66 connected to the discharge portion 54g of the housing 54a. The discharge portion 91b is connected with the pipe member 66 connected to the supply portion 54f of the housing 54a. Cooling water can thus circulate the first cooling fan 90, the pipe member 66, and the interior of the housing 54a (water jacket 54e), and cooling water used for cooling the housing 54a can be cooled by the first radiator 91.

As shown in FIG. 3, the pipe member 66 is provided, in a halfway portion, with a pump 67 configured to forcibly circulate cooling water. The halfway portion of the pipe member 66 can optionally be connected to the electric power control device 57 to cool also the interior of the electric power control device 57.

The first cooling fan 90 is supported by the first radiator 91 that is supported by the support frame 70. That is, the first cooling fan 90 is supported by support frame 70 via the first radiator 91.

The support frame 70 includes a third frame body 70c supporting the first radiator 91. The third frame body 70c includes a bracket 70c1, a first vertical member 70c2, a second vertical member 70c3, a coupling member 70c4, and a support plate 70c5.

The bracket 70c1 is attached to the rear plate 70a2 of the first frame body 70a. The first vertical member 70c2 and the second vertical member 70c3 extend vertically (in the up-down direction). The first vertical member 70c2 has an upper end fixed to the left of the bracket 70c1, and the second vertical member 70c3 has an upper end fixed to the right of the bracket 70c1. The coupling member 70c4 couples a halfway portion of the first vertical member 70c2 and a halfway portion of the second vertical member 70c3. The support plate 70c5 extends in the width direction, and has a left portion fixing the lower end of the first vertical member 70c2 and a right portion fixing the lower end of the second vertical member 70c3.

The first radiator 91 has a top supported by the bracket 70c1 via a connection fitting 92 and a bottom supported by the support plate 70c5 via a connection fitting 93. The first radiator 91 has a rear surface connected with the fan support portion 90b via a connection fitting.

The first cooling fan 90 can thus cool the battery case 56b as well as cooling water of the rotary electrical device 54 by way of the first radiator 91.

The support frame 70 is provided with a bracket 94 supporting the pipe member 66 at a position adjacent to the first radiator 91. Fixed to the bracket 94 is a measurement device 95 configured to measure a temperature of cooling water in the pipe member 66. The bracket 94 supports the measurement device 95 and the pipe member 66.

Described next is the air flows generated by the second cooling fan 52 and the first cooling fan 90. As shown in FIG. 3, the actuated second cooling fan 52 generates an air flow A from the front to the rear of the machine body 2. Specifically, the generated air flow A passes through the hydraulic device 55, the rotary electrical device 54, the engine 50, and the second radiator 53. The air flow A can thus cool the rotary electrical device 54, the engine 50, and the second radiator 53. The work machine 1 is configured to be driven in accordance with the parallel hybrid system as exemplified above. The rotary electrical device 54 thus generates electric current at several hundred amperes to be likely to generate heat. In view of this, the rotary electrical device 54 has the cooling structure according to a water cooling system. The second cooling fan 52 cools the rotary electrical device 54 by means of air in the present embodiment. Such use of both the air cooling system and the water cooling system facilitates the water cooling structure. The parallel hybrid system is exemplified to describe cooling the rotary electrical device 54. The work machine 1 is, however, not limited to the parallel hybrid system in terms of driving. Specifically, the water cooling structure can be facilitated in a case of adopting the structure of generating the air flow A from the front to the rear of the machine body 2 to cool the rotary electrical device 54 by means of both air and water.

The actuated first cooling fan 90 generates an air flow B from the center to the rear of the machine body 2. Specifically, the generated air flow B passes through the battery case 56*b* and the first radiator 91. This configuration achieves cooling of the battery case 56*b* and cooling of cooling water in the first radiator 91. The air flow B is similar to the air flow A. Specifically, the first cooling fan 90 and the second cooling fan 52 generates the air flows directed identically. The interior of the machine body 2 can thus be cooled efficiently.

As described above, the battery unit 56 is provided adjacent to the engine 50 to increase an ambient temperature of the battery 56*a* into a temperature range enabling efficient operation of the battery 56*a* with heat (radiant heat) generated by the engine 50. The temperature can be increased by the engine 50 with no separately provided heater or the like configured to appropriately increase the ambient temperature of the battery 56*a*. The battery 56*a* may have a low ambient temperature to need long time to be sufficiently actuated particularly in a case where the work machine is driven in a cold district or the like. This configuration shortens time to reach an appropriate operation temperature. The battery unit 56 adjacent to the engine 50 is provided above the engine 50 to increase the temperature quickly and inhibit adhesion of dust and the like to the battery unit 56 during work.

The shield plate 71 is provided to inhibit direct application of radiant heat of the engine 50 to the battery unit 56 and achieve an appropriate temperature even in the configuration of increasing the ambient temperature of the battery 56*a*. At least part of the battery unit 56, specifically, the portion above the particulate removal device 51, is provided above the electric power control device 57. In this configuration, radiant heat generated by the actuated particulate removal device 51 is not transmitted directly to the battery unit 56 to prolong the life of the battery 56*a*. The first cooling fan 90 is provided adjacent to the battery unit 56 to prevent excessive increase in temperature of the battery 56*a*.

The first cooling fan 90 is also applicable to a case where the battery unit 56 is not provided adjacent to the engine 50. The first cooling fan can decrease the temperature of the battery 56*a* into an appropriate temperature range when the battery 56*a* is increased in temperature at a position distant from the engine 50. In particular, the first cooling fan 90 is provided outside the battery case 56*b* to appropriately cool the battery unit 56 (the battery case 56*b*) in a simple configuration. The first radiator 91, which is provided between the first cooling fan 90 and the battery unit 56, can cool both the battery unit 56 and cooling water of the rotary electrical device 54, with no need for any separate mechanism configured to cool cooling water.

In a hybrid work machine embodied as the work machine 1 including the engine 50, the rotary electrical device 54, and the electric power control device 57, the electric power control device 57 lower in environmental resistance than the rotary electrical device 54 is provided above the rotary electrical device 54. This configuration easily inhibits application of dust and the like during work to the electric power control device 57 with no particular measures for improvement in environmental resistance of the electric power control device 57.

In the electric power control device 57, the connector (connecting portion) 57*b* for connection of the cable connected to the rotary electrical device 54 is directed downward. This configuration inhibits entry of dust and the like to (the rotary electrical device 54 positioned therebelow and) the connector 54*h*.

The engine 50 is typically supported by supporting the flywheel housing 50*b* with a mount device. However, in a case where the engine 50, the rotary electrical device 54, and the driving device 55 are aligned serially and the driving device 55 is configured to be driven by motive power from the engine 50 and/or the rotary electrical device 54, the driving device 55 is often cantilevered. If the driving device 55 is supported by the flywheel housing 50*b*, the supported position and the distal end of the driving device 55 have a long distance therebetween. As described above, the flywheel housing 50*b* is not supported with a mount device but is supported by the motor housing 54*a* via a mount device to support the engine 50 and the rotary electrical device 54. This configuration achieves integral and firm support of the engine 50 and the rotary electrical device 54, as well as a short distance from the supported position with the mount device to the distal end of the driving device 55, to inhibit deterioration in transmission of motive power due to the support structure.

The embodiment of the present invention has been described above. The embodiment disclosed herein should be regarded as not restrictive but exemplary in all aspects. The scope of the present invention is defined not by the above description but by the claims, and is intended to include meanings equivalent to the claims and all the modifications within the scope.

Obviously, numerous modifications and variations of the present invention are possible in light of the above teachings. It is therefore to be understood that within the scope of the appended claims, the invention may be practiced otherwise than as specifically described herein.

What is claimed is:

1. A work machine comprising:
   a machine body;
   an engine provided on the machine body to move the machine body;
   a rotary electrical device provided on the machine body to move the machine body and to generate electric power;
   a battery to be charged by the rotary electrical device and to discharge electric power to the rotary electrical device to move the machine body, the battery being provided above the engine to overlap with the engine when viewed in a height direction along a height of the work machine;
   a particulate removal device to capture minute particulates in exhaust gas discharged from the engine; and
   an electric power controller provided above the particulate removal device and below at least part of the battery in the height direction to control the rotary electrical device.

2. The work machine according to claim 1, further comprising:
a cooling fan provided adjacent to the battery to overlap with the battery in a front-rear direction perpendicular to the height direction.

3. The work machine according to claim 2, wherein the cooling fan is provided above the engine to overlap with the engine in the height direction.

4. The work machine according to claim 3, further comprising:
an additional cooling fan provided opposite to the rotary electrical device with respect to the engine in the front-rear direction; and
a second radiator provided such that the additional cooling fan is provided between the second radiator and the engine in the front-rear direction.

5. The work machine according to claim 4,
wherein a first air generated by the cooling fan flows in a first direction along the front-rear direction,
wherein a second air generated by the additional cooling fan flows in a second direction along the front-rear direction, and
wherein the first direction is substantially equal to the second direction.

6. The work machine according to claim 4, wherein the battery is provided above the rotary electrical device to overlap with the rotary electrical device when viewed in the height direction along the height of the work machine.

7. The work machine according to claim 2, further comprising:
a battery case accommodating the battery, the cooling fan being provided outside the battery case.

8. The work machine according to claim 2, further comprising:
a first radiator provided between the cooling fan and the battery to cool cooling water of the rotary electrical device.

9. The work machine according to claim 1, wherein the machine body comprises
a first side frame;
a second side frame provided opposite to the first side frame in a width direction along a width of the work machine, the width direction being perpendicular to the height direction, the first side frame and the second side frame supporting the engine therebetween; and
a connecting frame connecting the first side frame and the second side frame above the engine, the battery provided on the connecting frame.

10. The work machine according to claim 9, further comprising:
a cooling fan that is provided on the connecting frame.

11. The work machine according to claim 9, further comprising:
a work implement mounted to the machine body to be driven by at least one of the engine and the rotary electrical device.

12. The work machine according to claim 9, wherein the machine body comprises a bottom frame via which the first side frame and the second side frame support the engine therebetween.

13. The work machine according to claim 9, further comprising:
a travel device supporting the first side frame and the second side frame.

14. The work machine according to claim 1,
wherein the particulate removal device having a particulate removal device top surface and a particulate removal device bottom surface which is opposite to the particulate removal device top surface in the height direction and higher than a bottom surface of the engine in the height direction.

15. The work machine according to claim 1, further comprising:
a shield plate provided between the battery and the engine in the height direction.

16. The work machine according to claim 1, further comprising:
a work implement mounted to the machine body to be driven by at least one of the engine and the rotary electrical device.

17. The work machine according to claim 1,
wherein the engine has an engine front end and an engine rear end opposite to the engine front end in a front-rear direction of the work machine which is perpendicular to the height direction, and
wherein the battery has a battery front end and a battery rear end which is opposite to the battery front end in the front-rear direction and which is more forward than the engine rear end in the front-rear direction.

18. A work machine comprising:
a machine body;
an engine provided on the machine body to move the machine body;
a rotary electrical device provided on the machine body to move the machine body and to generate electric power;
a battery to be charged by the rotary electrical device and to discharge electric power to the rotary electrical device to move the machine body;
a particulate removal device to capture minute particulates in exhaust gas discharged from the engine, the particulate removal device having a particulate removal device top surface and a particulate removal device bottom surface which is opposite to the particulate removal device top surface in a height direction along a height of the work machine and higher than a bottom surface of the engine in the height direction; and
an electric power controller provided above the particulate removal device and below at least part of the battery in the height direction to control the rotary electrical device.

19. A work machine comprising:
a machine body;
an engine provided on the machine body to move the machine body;
a rotary electrical device provided on the machine body to move the machine body and to generate electric power;
a battery provided above the engine in a height direction along a height of the work machine to be charged by the rotary electrical device and to discharge electric power to the rotary electrical device to move the machine body;
a first cooling fan provided adjacent to the battery and above the engine in the height direction to generate a first air flowing in a first direction along a front-rear direction perpendicular to the height direction;
a second cooling fan provided behind the engine in the front-rear direction to generate a second air flowing in a second direction along the front-rear direction, the second direction being substantially equal to the first direction; and
a second radiator provided behind the second cooling fan in the front-rear direction.

* * * * *